UNITED STATES PATENT OFFICE.

BENNO HOMOLKA, OF FRANKFORT-ON-THE-MAIN, AND RICHARD WELDE, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

PROCESS OF MAKING SULFURIZED DYES.

No. 894,005.   Specification of Letters Patent.   Patented July 21, 1908.

Application filed February 5, 1907. Serial No. 355,874.

*To all whom it may concern:*

Be it known that we, BENNO HOMOLKA, Ph. D., and RICHARD WELDE, Ph. D., chemists, citizens of the Empire of Germany, and residing at Frankfort-on-the-Main and Höchst-on-the-Main, Germany, respectively, have invented certain new and useful Improvements in Processes of Making Sulfurized Dyestuffs, of which the following is a specification.

We have found that sulfurous dyestuffs may be obtained from alpha-oxythionaphthenes having the general formula:

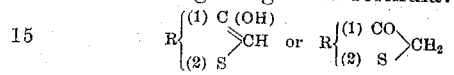

or from their carboxylic acids having the general formula:

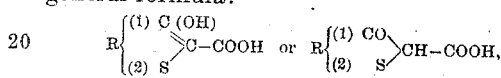

if said bodies be heated with the soluble salts of thiosulfuric acid, for instance, with sodium thiosulfate, $Na_2S_2O_3 + 5H_2O$, to temperature above 100° C.

In the above general formulas "R" means an aromatic residue, for instance, $C_6H_4$ for the hydrogen atoms of which other elements or groups may be partly or wholly substituted.

Example 1. 10 parts by weight of one of the above mentioned alpha-oxythionaphtones or of an alpha-oxythionaphthene carboxylic acid are heated preferably in a closed vessel to about 100–130° C with 100 parts by weight of crystallized sodium sulfate

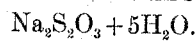

When cold the product of reaction is extracted with water, the separated dyestuff is collected on a filter and dried. It has the following formula: $C_{16}H_8S_2O_2$.

The dyestuffs are red crystalline powders, insoluble in water, soluble with a green color in concentrated sulfuric acid and with a red color in chloroform; they are reduced by alkaline reducing agents and dye in the vat textile fibers a red shade.

For the sodium thiosulfate may be substituted other alkaline- or alkaline earths metals. If they contain no water of crystallization, some water may be added to the mass.

Having now described our invention, what we claim is:—

1. The process herein described for making sulfurous dyestuffs, which consists in heating alpha-oxythionaphthenes with in water soluble thiosulfates in presence of water to temperatures above 100° C.

2. The process herein described for making sulfurous dyestuffs, which consists in heating alpha-oxythionaphthene-carboxylic acids with thiosulfates soluble in water in presence of water to temperatures above 100° C.

In testimony, that we claim the foregoing as our invention, we have signed our names in presence of two subscribing witnesses.

BENNO HOMOLKA.
RICHARD WELDE.

Witnesses:
  JEAN GRUND,
  CARL GRUND.